United States Patent
Hsu et al.

(10) Patent No.: US 8,073,568 B2
(45) Date of Patent: Dec. 6, 2011

(54) DEVICE UTILIZING A PID CONTROLLER, CONTROL METHOD THEREOF, AND ROBOT UTILIZING THE CONTROLLER

(75) Inventors: Yuan-Che Hsu, Taipei Hsien (TW); Yan-Chun Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 361 days.

(21) Appl. No.: 12/535,678

(22) Filed: Aug. 5, 2009

(65) Prior Publication Data

US 2010/0262289 A1 Oct. 14, 2010

(30) Foreign Application Priority Data

Apr. 10, 2009 (CN) .......................... 2009 1 0301475

(51) Int. Cl.
*G05B 15/00* (2006.01)
*G05B 19/408* (2006.01)

(52) U.S. Cl. ... 700/260; 700/249; 700/258; 318/568.23; 318/568.2; 318/568.16; 318/568.12; 901/2; 901/9

(58) Field of Classification Search ............... 700/260, 700/249, 258, 245, 90; 901/9, 2; 318/568.12, 318/568.23, 568.2, 568.16, 568.22, 671
See application file for complete search history.

(56) References Cited

U.S. PATENT DOCUMENTS

| | | | | |
|---|---|---|---|---|
| 4,975,856 A | * | 12/1990 | Vold et al. | 700/263 |
| 6,507,165 B2 | * | 1/2003 | Kato et al. | 318/611 |
| 6,882,086 B2 | * | 4/2005 | Kornbluh et al. | 310/328 |
| 7,937,185 B2 | * | 5/2011 | Zaier | 700/245 |
| 2001/0033146 A1 | * | 10/2001 | Kato et al. | 318/568.22 |
| 2004/0106916 A1 | * | 6/2004 | Quaid et al. | 606/1 |
| 2006/0071625 A1 | * | 4/2006 | Nakata et al. | 318/568.12 |
| 2007/0150095 A1 | * | 6/2007 | Zaier | 700/245 |
| 2009/0069942 A1 | * | 3/2009 | Takahashi | 700/260 |
| 2010/0087955 A1 | * | 4/2010 | Tsusaka et al. | 700/245 |

* cited by examiner

*Primary Examiner* — Ronnie Mancho

(74) *Attorney, Agent, or Firm* — Altis Law Group, Inc.

(57) ABSTRACT

A control method utilizing a PID controller includes detecting the position of an object and obtaining the position deviation by comparison with a predetermined position value, detecting the vibration of the object and obtaining a vibration value, adjusting the control parameters of the PID controller by analyzing the position deviation, the vibration value, and a predetermined performance of the PID controller, and the PID controller responding to the adjusted control parameters.

18 Claims, 4 Drawing Sheets

(12)  United States Patent

DEVICE UTILIZING A PID CONTROLLER, CONTROL METHOD THEREOF, AND ROBOT UTILIZING THE CONTROLLER

BACKGROUND

1. Technical Field

The present disclosure generally relates to automatic control technology, and particularly to a control method and a device utilizing a PID controller, and a robot applying the device.

2. Description of the Related Art

A proportional-integral-derivation controller (PID controller) is a generic control loop feedback device widely used in industrial control systems, such as robot manipulator controlling systems. The popularity of PID controllers can be attributed partly to their robust performance in a wide range of operating conditions and partly to their functional simplicity, which allows engineers to operate them in a simple, straightforward manner.

A PID controller attempts to correct an error between a measured process variable and a desired setpoint by calculating and then outputting a corrective action that can adjust the process accordingly and rapidly, to keep the error minimal. The PID controller calculation (algorithm) involves three basic coefficients: the proportional (Kp), the integral (Ki) and derivative (Kd). The proportional value determines the reaction to the current error, the integral value determines the reaction based on the sum of recent errors, and the derivative value determines the reaction based on the rate at which the error has been changing. The weighted sum of these three actions is used to adjust the process via a control element such as the position of a control valve or the power supply of a driving element. By tuning the three coefficients in the PID controller algorithm, the controller can provide control actions designed for specific process requirements.

A commonly used method for adjusting the three coefficients of a PID controller is manual tuning. For example, when adjusting the PID controller applied by a robot manipulator, Kp is increased to shorten response time and minimize oscillation. However, too much Kp will cause instability, and the manipulator will vibrate intensely. Therefore Kp is adjusted to an optimize PID controller performance while manually controlling the vibration. After repeated manual tunings, an optimum Kp is obtained. However, this adjustment of the Kp wastes time and is dependent upon tester intuition and experience. Additionally, in the case of the same system, the reference variables and the reference values applied to a specific operation state are not applied optimally to another state of the same system.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure.

DETAILED DESCRIPTION

Figure 1:
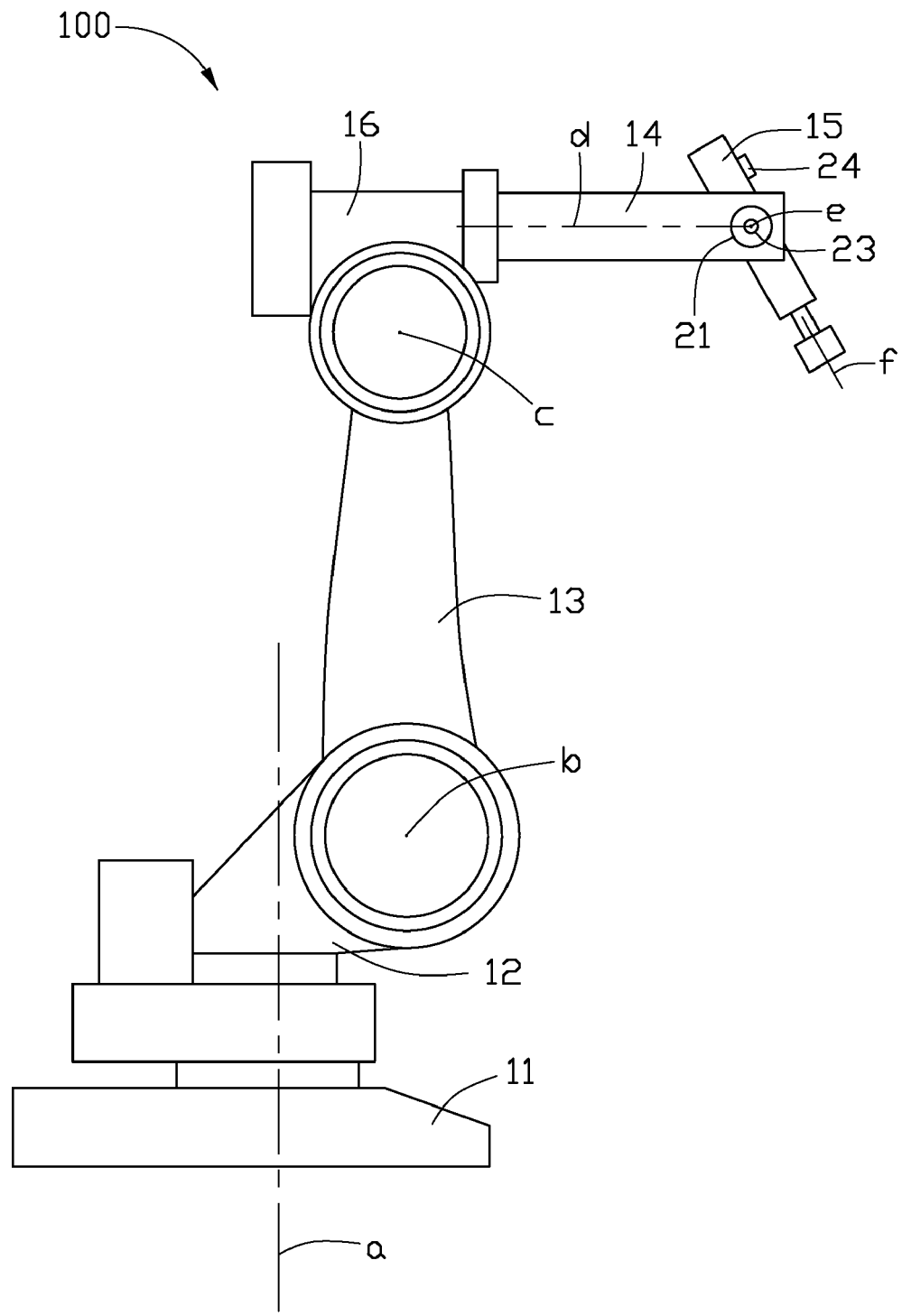
FIG. 1 is a plan view of an embodiment of a robot applying an embodiment of a control device.

FIG. 1 is a plan view of an embodiment of an industrial robot 100. The industrial robot 100 includes a base seat 11, a bracket 12 rotatably connected to the base seat 11, a first support arm 13 rotatably connected to the bracket 12, a joint portion 16 rotatably connected to the first support arm 13, a second support arm 14 rotatably connected to the joint portion 16, and a third support arm 15 rotatably connected to the second support arm 14.

The industrial robot 100 is supported by the base seat 11 and has six rotation axes. The bracket 12 is rotatable around a first axis a. The first, second, and third support arms 13, 14, 15 are rotatable around a second, third, and fourth axes b, d, and e respectively. The industrial robot 100 further includes a fifth and sixth axes schematically indicated by c and f, respectively. An operating device (not shown), such as a clamp, a cutter, or a detector is generally positioned on an end of the third support arm 15 along the sixth axis f to realize various operations. Along each rotation axis, a stepper motor 21 is mounted thereon to drive an output shaft and the support arm connected to the output shaft to move to a desired position. FIG. 1 shows only the stepper motor 21 mounted on the fourth axis e to drive the third support arm 15, and the stepper motor mounted on other axes are omitted here for convenience.

Figure 2:
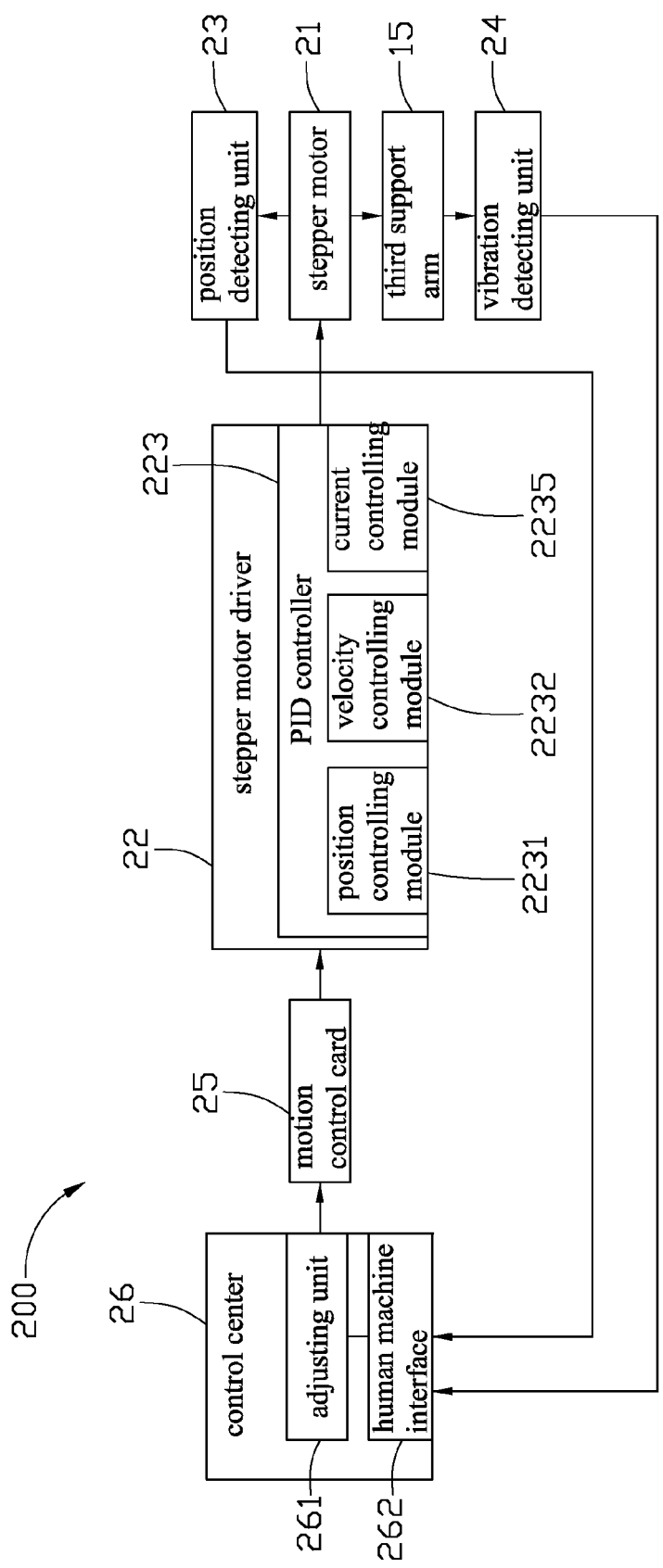
FIG. 2 is a block diagram of the control device of FIG. 1 with a PID controller therein.
Figure 3:
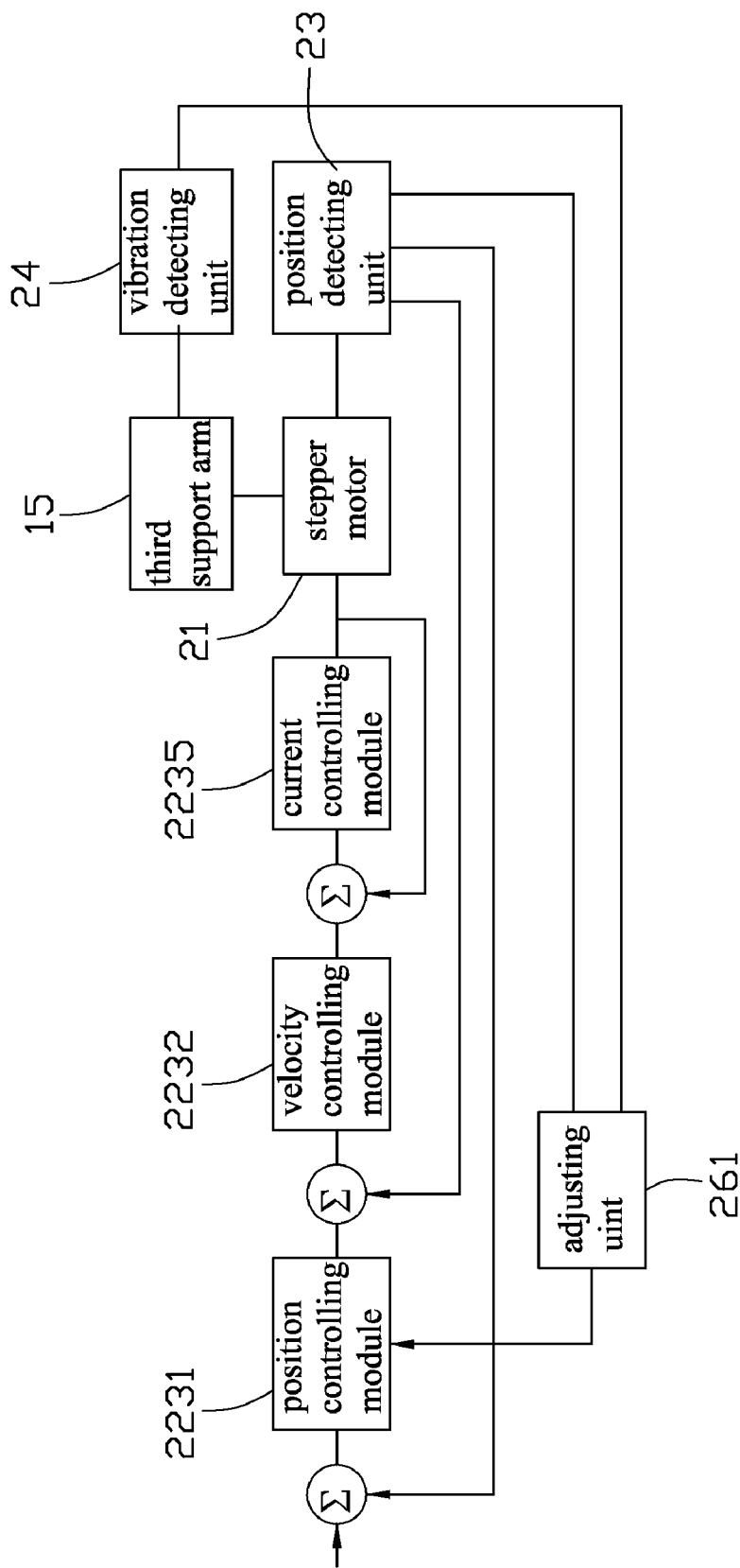
FIG. 3 is similar to FIG. 2, but shows the principle of the control device of FIG. 2.

FIG. 2 is a block diagram of a control device 200, and FIG. 3 shows the principle of the control device 200 applied by the industrial robot 100. The control device 200 includes six stepper motor drivers 22 used to drive the stepper motors 21, a position detection unit 23, a vibration detection unit 24, a motion control card 25 and a control center 26. The control center 26 may be a computer including an adjustment unit 261 and a human machine interface (HMI) 262. The vibration detection unit 24 detects vibration in the third support arm 15, and the position detection unit 23 detects the placement of the third support arm 15. Both the vibration and placement signals are outputted to the adjustment unit 261. The motion control card 25 can generate pulse control signals according to the adjustment unit 261. The stepper motor driver 22 converts the pulse control signals into angular displacement signals so that the support arm can move to a predetermined position. The stepper motor driver 22 has a PID controller 223 therein. The PID controller 223 provides a three-term control action by serially connecting a position control module 2231, a velocity control module 2232, and a current control module 2235. Three coefficients Kp, Ki, Kd of the PID controller 223 may be adjustable.

The position detection unit 23 is connected to the control center 26 to detect the position (rotating angular displacement) of the third support arm 15 around the fourth axis e and feed the position signals back to the adjustment unit 261. In the illustrated embodiment, the position detection unit 23 is an optical rotary encoder sensor mounted on the output shaft of the stepper motor 21 to detect the rotating angular displacement of the third support arm 15.

The vibration detection unit 24 is connected to the control center 26 to detect the vibration of the third support arm 15. In the illustrated embodiment, the vibration detection unit 24 is an acceleration sensor mounted on the third support arm 15 to obtain both the amplitude and frequency of vibration, and feed the vibration signals back to the adjustment unit 261.

The motion control card 25 may generate control signals to drive one or more stepper motors 21 to accelerate or decelerate automatically and detect the original position and the position limiting signals. The control signals include pulse control signals and direction signals. In the illustrated embodiment, the industrial robot 100 applies a six axes motion control card 25 for six axes motion control.

The adjustment unit 261 receives the information outputted from the position detection unit 23 and the vibration detection unit 24, and calculates a position deviation by subtracting the detected position from a predetermined position value of the third support arm 15 set by the PID controller 223. The adjustment unit 261 adjusts the three coefficients Kp, Ki, Kd by analyzing the predetermined dynamic performance of the control device 200, the vibration and the position deviation. In response to the adjusted coefficients Kp, Ki, Kd, the PID controller 223 is capable of controlling the control device 200 to satisfy an optimum performance with shorter response time and less overshoot. The adjusted coefficient Kp may be transmitted by serial port from the control center 26 to the PID controller 223. The human machine interface 262 displays the dynamic response diagram of the control device 200, such as a time domain response, and provides an interface window to configure some of the control parameters of the control device 200.

The position control module 2231 returns a position deviation from a predetermined position and minimizes the position deviation by changing the coefficient Kp. As the coefficient Kp is increased, the steady deviation may be reduced, and the response time may become shorter, but may cause more overshoot. Contrarily, as the coefficient Kp is decreased, the overshoot may be improved, but the response time may become longer.

Figure 4:
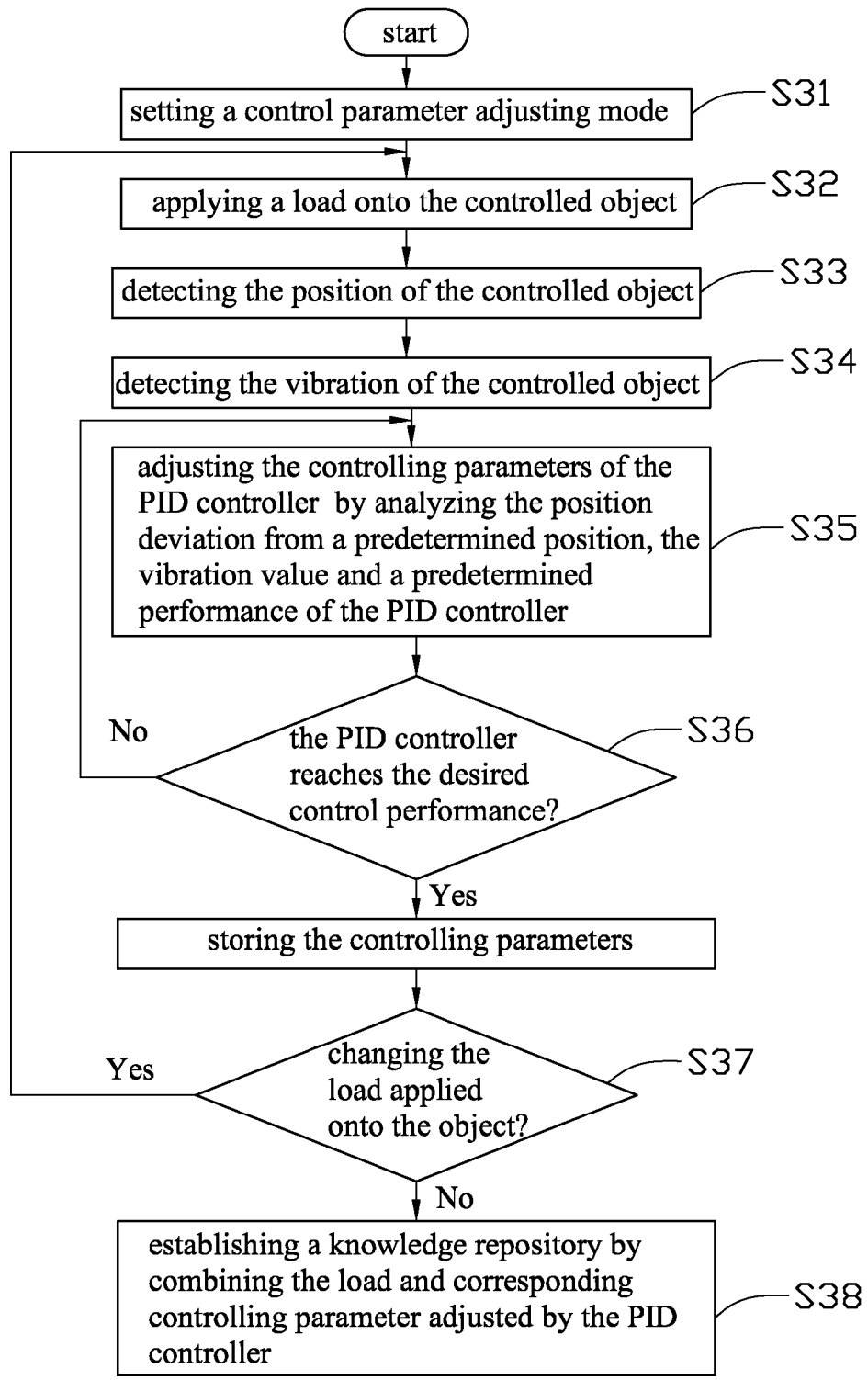
FIG. 4 is a flowchart of an embodiment of a control method of the PID controller.

FIG. 4 is a flowchart illustrating an embodiment of a control method applied by the control device 200. Depending on the embodiment, certain of the steps described below may be removed and others may be added.

In step S31, the control parameter adjusting mode is set to a semi-automatic mode in which only the coefficient Kp of the position control module 2231 is adjustable.

In step S32, a load is applied to the controlled object. The load is set onto the third support arm 15, and an initial condition and disturbance generated by the load is retained.

In step S33, the position detection unit 23 detects the rotating angular displacement of the third support arm 15 around the fourth axis e using an optical rotary encoder sensor.

In step S34, the vibration detection unit 24 utilizes the acceleration sensor to detect the vibration information around three coordinate axes of the coordinate space. The vibration information includes the vibration amplitude and frequency of the third support arm 15.

In steps S35 and S36, control parameters of the PID controller 223 are adjusted by analyzing position deviations from a predetermined position, the vibration value, and a predetermined performance of the PID controller 223. Specifically, the range of the coefficient Kp of the PID controller 223 is set by setting a minimum vibration value and a maximum vibration value. The coefficient Kp is adjusted in the range by means of increasing the coefficient Kp when the detected vibration value is less than the minimum vibration value, and decreasing the control parameters when the detected vibration value exceeds the predetermined maximum vibration value. In the illustrated embodiment, when adjusting the coefficient Kp, the time domain response graph displayed by the human machine interface 262 is referenced, such that when the detected vibration value and the response time both reach the desired performance, the current coefficient Kp is maintained and the coefficient Kp of the PID controller 223 is set by a serial port.

In step S37, various loads are applied on the third support arm 15, whereby the initial condition and the exterior disturbance are changed, repeating steps S32 to S36. An optimized coefficient Kp is obtained corresponding to the load, and the coefficient Kp is stored in a memory of the PID controller 223. Repeating the step S37, the optimized coefficient Kp corresponding to the various loads are obtained.

In step S38, a knowledge repository is established by combining the load and corresponding control parameters adjusted by the PID controller 223. The knowledge repository may be stored in the control center 26. When setting the coefficient Kp of other PID controllers for use by others robots, the adjusting time can be decreased by selecting the coefficient Kp in the knowledge repository to match the load, the vibration, and the response time.

It should be understood that although the present disclosure is, by way of example, applied to the third support arm 15 of the robot 100, it is understood that the application of the present invention is not limited thereto.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A control method utilizing a proportional-integral-derivation (PID) controller, the control method comprising:
   detecting the position of an object and obtaining a position deviation by comparison with a predetermined position value;
   detecting the vibration of the object and obtaining a vibration value;
   adjusting the control parameters of the PID controller by analyzing the position deviation, the vibration value, and a predetermined performance of the PID controller; and
   the PID controller responding to the adjusted control parameters.

2. The control method utilizing a PID controller of claim 1, wherein the control method further comprises setting a range of the control parameters by setting a minimum vibration value and a maximum vibration value, and adjusting the control parameters in the range by means of increasing the control parameters when the detected vibration value is less than the minimum vibration value, and decreasing the control parameters when the detected vibration value exceeds the predetermined maximum vibration value.

3. The control method utilizing a PID controller of claim 1, wherein the predetermined performance of the PID controller comprises a response time and an overshoot control performance.

4. The control method utilizing a PID controller of claim 1, wherein the control method further comprises applying a load on the object before adjusting the control parameters of the PID controller by analyzing the position deviation of the object, the vibration value, and the predetermined performance of the PID controller.

5. The control method utilizing a PID controller of claim 4, wherein the control method further comprises applying the load on the object repeatedly, and establishing a knowledge repository by combining the load and corresponding control parameters adjusted by the PID controller.

6. The control method utilizing a PID controller of claim 1, wherein the position of the object is detected by an optical rotary encoder.

7. The control method utilizing a PID controller of claim 1, wherein the vibration of the object is detected by an acceleration sensor.

8. The control method utilizing a PID controller of claim 1, wherein the vibration value includes amplitude and frequency.

9. A device utilizing a proportional-integral-derivation (PID) controller comprising:
   a PID controller comprising a vibration detection unit calculating vibration of an object, and an adjustment unit;

a position detection unit detecting a position of the object, and feeding the position back to the PID controller;

wherein the adjustment unit calculates a position deviation of the position of the object by comparison with a predetermined position value, and adjusts parameters of the PID controller by analyzing the position deviation of the object, the vibration, and a predetermined performance of the PID controller; the PID controller outputs a control signal to control the object.

10. The device utilizing a PID controller of claim 9, wherein the adjustment unit sets the range of the control parameters by setting a minimum vibration value and a maximum vibration value, and the control parameters are adjusted in the range by means of increasing the control parameters when the detected vibration value is less than the minimum vibration value, and decreasing the control parameters when the detected vibration value exceeds the predetermined maximum vibration value.

11. The device utilizing a PID controller of claim 9, wherein the predetermined performance of the PID controller includes a response time and an overshoot control performance.

12. The device utilizing a PID controller of claim 9, wherein the PID controller further comprises a position control module, a velocity control module, and a current control module connected serially; the adjustment unit adjusts the control parameters of the position control module.

13. The device utilizing a PID controller of claim 9, wherein the position detection unit comprises an encoder sensor detecting the position of the object.

14. The device utilizing a PID controller of claim 9, wherein the vibration detection unit comprises an acceleration sensor detecting the vibration along three coordinate axes of a coordinate space.

15. The device utilizing a PID controller of claim 14, wherein the acceleration sensor detects the amplitude and frequency of the vibration.

16. A robot comprising:
at least one arm;
a stepper motor controlling the at least one arm;
a driver driving the stepper motor; and
a controller connected to the driver, the controller comprising:
a proportional-integral-derivation (PID) controller;
a position detection unit detecting a position of the at least one arm, and feeding the position back to the PID controller;
a vibration detection unit detecting a vibration of the at least one arm; and
an adjustment unit obtaining a position deviation of the at least one arm by comparison of the position of the at least one arm with a predetermined position value, wherein control parameters of the PID controller are adjusted by analyzing the position deviation of the at least one arm, the vibration, and a predetermined performance of the PID controller.

17. The robot of claim 16, further comprising a base seat, a bracket rotatably connected to the base seat, a first support arm rotatably connected to the bracket, a joint portion rotatably connected to the first support arm, a second support arm rotatably connected to the joint portion, and a third support arm rotatably connected to the second support arm.

18. The robot of claim 16, wherein the robot further comprises a human machine interface displaying a dynamic response diagram of the at least one arm.

* * * * *